United States Patent Office 3,396,191
Patented Aug. 6, 1968

3,396,191
PRODUCTION OF ESTERS OF UNSATURATED
ALIPHATIC DICARBOXYLIC ACIDS
Walter Reppe, Heidelberg, and August Magin, Mutterstadt, Pfalz, Germany, assignors to Badische Anilin- & Soda-Fabrik Aktiengesellschaft, Ludwigshafen (Rhine), Germany
No Drawing. Continuation-in-part of application Ser. No. 188,263, Apr. 17, 1962. This application July 7, 1964, Ser. No. 380,932
Claims priority, application Germany, Apr. 19, 1961, B 62,191
8 Claims. (Cl. 260—485)

ABSTRACT OF THE DISCLOSURE

A process for the production of unsaturated dicarboxylic esters in which a substantial anhydrous alcohol is contacted with acetylene, nickel tetracarbonyl, and a non-oxidizing acid at temperatures of 30° to 120° C. The process is carried out in the presence of a copper salt and a complex-forming compound such as N-N-dialkylaniline. A stoichiometric excess of the nickel tetracarbonyl over the acid is present in the reaction mixture and the ratio by weight of acetylene to the carbon monoxide content of nickel tetracarbonyl is from 1.3:1 to 5:1. The process is capable of producing unsaturated dicarboxylic esters in a ratio by weight of unsaturated dicarboxylic ester to acrylic ester of greater than 1:1.

---

The present application is a continuation-in-part of application Ser. No. 188,263 which was filed on Apr. 17, 1962, and is now abandoned.

This invention relates to a process for the production of unsaturated aliphatic dicarboxylic esters.

It is known to prepare acrylic esters from acetylene, carbon monoxide and alcohols in the presence of nickel carbonyl or cobalt carbonyl catalysts. In the "stoichiometric" method, in which the carbon monoxide is provided by the metal carbonyl, an acid must be simultaneously present during reaction in order to combine with the metal of the carbonyl to form a salt. If water is excluded, propionic esters are formed in considerable amounts. It is also known that, when cobalt containing catalysts are used, certain amounts of succinic, fumaric and ethanetricarboxylic esters as well as small amounts of ketopimelic acid and 2-butene-1,4-dicarboxylic acid are obtained in addition to acrylic esters. U.S. patent specification No. 2,582,911 describes a process for the production of acrylic ester from acetylene, carbon monoxide and alcohols in the presence of nickel tetracarbonyl and a mineral acid according to which the mineral acid is used in a molar ratio of at least 0.60 to 1 with reference to nickel carbonyl. U.S. patent specification No. 2,886,591 describes a process for the production of acrylic ester in which the addition of complex forming agents is recommended and U.S. patent specification No. 3,002,016 describes the preparation of ethyl acrylate in the presence of a catalyst based on nickel tetracarbonyl which catalyst has been formed in the presence of mercuric salts. By varying the conditions of said processes within the specified ranges, the yield of acrylic ester can be controlled and reduced in favor of the formation of byproducts of various kinds; however, the ratio by weight of acrylic ester to dicarboxylic ester is always above 1:1.

The object of the present invention is a process for the production of unsaturated dicarboxylic esters, as the main product, from acetylene, carbon monoxide and alcohols. More specifically the object of the invention is a process for the reaction of acetylene, carbon monoxide and alcohols in which the reaction conditions used are such that the dicarboxylic ester and the acrylic ester are obtained in a molar ratio which is the reverse of that achieved by the processes of the prior art, i.e., in a ratio by weight of acrylic ester to unsaturated dicarboxylic ester which is less than 1:1.

We have found that esters of unsaturated aliphatic dicarboxylic acids of the formula

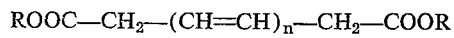

$$ROOC\text{---}CH_2\text{---}(CH\!=\!CH)_n\text{---}CH_2\text{---}COOR$$

in which R denotes an alkyl radical with 1 to 18 carbon atoms, and $n$ denotes an integer of from 2 to 4, are obtained by contacting, at a temperature of 30° to 120° C., a compound of the formula ROH, in which R has the same meaning as in the formula above, said compound being anhydrous or containing a maximum of 5% by weight of water, with acetylene and nickel tetracarbonyl, the ratio by weight of the acetylene to the carbon monoxide contained in the nickel tetracarbonyl being from 1.3:1 to 5:1, and, simultaneously, with an inorganic or an organic acid which are both non-oxidizing under the reaction conditions, said acid being introduced into the reaction mixture in such an amount that the nickel carbonyl is always present in a stoichiometric excess over the acid, while carrying out the reaction in the presence of a complex forming agent, such as N,N-dialkylaniline with 1 to 6 carbon atoms in each alkyl, N,N-dialkylamino acetic acid with 1 to 4 carbon atoms in each alkyl and salicylaldehyde, and of a copper salt.

When hydrogen chloride is used as a non-oxidizing acid, the process proceeds as illustrated by the following equation:

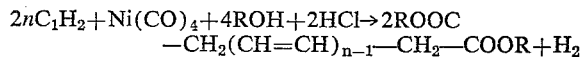

$$2nC_1H_2 + Ni(CO)_4 + 4ROH + 2HCl \rightarrow 2ROOC\text{---}CH_2(CH\!=\!CH)_{n-1}\text{---}CH_2\text{---}COOR + H_2$$

in which R and $n$ have the meanings given above.

As will be seen, the reaction proceeds to completion when 4 to 8 moles of acetylene are used to one mole of nickel tetracarbonyl, 4 moles of alcohol being consumed. It is advantageous to use the alcohol in excess compared with the theoretically required amount of nickel tetracarbonyl, which excess of alcohol serves as solvent. For example, 12 to 16 moles of alcohol may be used per mole of nickel tetracarbonyl.

The alcohols used may be straight-chain or branched alkanols, those having from 1 to 6 carbon atoms being preferred. Examples of suitable alcohols are methanol, ethanol, propanol, isopropanol, butanols, such as n-butanol or isobutanol, trimethylcarbinol, hexanol, n-octanol, dodecyl alcohol and stearyl alcohol.

The nickel carbonyl may be replaced by an equivalent amount of carbon monoxide to an extent of up to 80 mole percent. In this case, the carbon monoxide is introduced into the reaction mixture either together with the acetylene or separately. It is essential that the nickel carbonyl be introduced in a stoichiometric excess in this case also.

It is an essential condition that the acetylene be present in an excess of at least 30% by weight, preferably not more than 500%, over the carbon monoxide present in the nickel tetracarbonyl or in free form.

The acetylene may be used either in pure form or diluted with inert gases, for example methane.

The acid is always introduced in an amount inferior to that required for the reaction between nickel tetracarbonyl and acid to form a nickel (II) salt and carbon monoxide; i.e., when monobasic acids are used, less than 2 moles of acid, for example only 1 to 1.5 moles of acid, is added per mole of nickel carbonyl; when dibasic acids are used, less than 1 mole of acid is added per mole of nickel carbonyl.

The acids used are inorganic acids which are non-oxidizing under the reaction conditions, for example sulfuric acid, sulfurous acid, phosphoric acid or phosphorous acid. However, halohydraacids, such as hydrogen iodide, hydrogen bromide and especially hydrogen chloride, are preferred. Organic saturated or olefinically unsaturated aliphatic or cycloaliphatic monocarboxylic or dicarboxylic acids with up to 12 carbon atoms, such as formic acid, acetic acid, propionic acid, butyric acid, acrylic acid, crotonic acid, oxalic acid, succinic acid, adipic acid, fumaric acid, maleic acid, cyclohexanecarboxylic acid, hexahydrophthalic acids or cyclohexenecarboxylic acids, or also unsaturated dicarboxylic acid such as form the basis of the esters formed, for example 2-butene-1,4-dicarboxylic acid or 2,4-hexadiene-1,6-dicarboxylic acid, may also be used.

It is a further condition that a substance should be added which forms complexes with the catalyst intermediately formed from nickel tetracarbonyl, acetylene and the acid.

Examples of agents forming complexes are salicylaldehyde, N,N-dialkyl substitued aromatic monoamines, especially those of N,N-dialkylanilines, such as N,N-dimethylaniline, N,N-diethylaniline, N,N-dibutylaniline, or N,N-dialkyl substituted acetic acid, such as dimethylaminoacetic acid. The amino compounds are preferably used in the form of the salts of acid used in the process, e.g., if hydrochloric acid is used, the amines are used in the form of their hydrochlorides. If they are used as free amino compounds, the amino group during reaction reacts at least partly with the acid added forming the said salts. This consumption of acid should also be taken into account in determining the amount of acid to be added to the nickel tetracarbonyl. In general, the said complex-forming substances are used in amounts ranging of from 5 to 30% with reference to the nickel carbonyl used. However, the reaction will also occur when larger amounts are used.

Another essential reaction condition is the presence in the reaction mixture of a copper salt. Preferred salts of the said type are copper halides or soluble complex compounds, especially salts of nitrilotriacetic acid or ethylenediaminotetracetic acid. Examples of copper salts are cupric chloride, copper nitrilotriacetate, copper ethylenediaminotetraacetate and the glyoxal-2-bis-hydroxyphenyl-anil copper complex.

The metal salts are used in an amount of from 2 to 30% by weight with reference to the nickel tetracarbonyl used.

The reaction conditions are largely similar to those used in the so-called "stoichiometric" acrylic ester synthesis from acetylene, nickel tetracarbonyl and alcohols. As a rule, the reaction is carried out at a temperature of from 30° to 120° C., but higher or lower temperatures may also be used.

Essential differences as compared with the prior art stoichiometric acrylic ester synthesis reside in the following facts:

(1) The process is carried out under anhydrous or substantially anhydrous conditions, i.e., in the presence of less than 5% by weight of water.

(2) The acetylene is applied in an excess of at least 30% by weight over the carbon monoxide present in the nickel tetracarbonyl and the free carbon monoxide.

(3) The proportion of the acid to nickel tetracarbonyl is inferior to that required for the formation of nickel (II) salts.

(4) The presence of at least one of the said complex forming agents.

(5) The presence of a copper salt.

It should be noted that the invention is essentially a combination of the said five features. The absence in the combination of any of the said conditions would result in a marked decrease in the yield of unsaturated dicarboxylic esters.

It is recommended to add polymerization inhibitors to the reaction mixture. Conventional polymerization inhibitors are, for example, hydroquinone, phenyl-α-naphthylamine, phenyl-β-naphthylamine, dinaphthol, methylene blue, metallic copper, copper salts and phenothiazine.

The process may also be carried out in the presence of solvents or diluents. Besides the alcohols mentioned above, which are used in excess, the following may be used as solvents or diluents: saturated aliphatic hydrocarbons or aromatic hydrocarbons boiling between 50° and 200° C., aliphatic or aromatic halohydrocarbons, open or cyclic ethers, dialkyl ketones, cycloalkanones, fatty acid esters with 3 to 10 carbon atoms, alkanedicarboxylic esters, benzenecarboxylic esters, cycloalkanedicarboxylic esters, fatty acid nitriles, fatty acid amides, lactones of ω-hydroxy fatty acids, lactams of ω-amino fatty acids of N-alkyl substituted lactams. Specific examples are gasoline fractions, n-octane, isooctane, cyclohexane, benzene, toluene, xylenes, carbon tetrachloride, dichloroethane, dichloropropane, chlorobenzenes, dibutyl ether, tetrahydrofurane, acetone, diethyl ketone, methyl ethyl ketone, cyclohexanone, ethyl acetate, butyl acetate, butyl propionate, dimethyl succinate, methyl benzoate, ethyl hexahydrobenzoate, acetonitrile, formamide, dimethylformamide, diethylformamide, butryolactone, valerolactone, pyrrolidone, caprolactam, N-methylpyrrolidone and N-butylcaprolactam.

The process may be carried out, for example, as follows: The anhydrous alcohol, a complex-forming substance and a copper salt are mixed in a stirred vessel, possibly with an inert solvent. After replacing the air with nitrogen and replacing the nitrogen with acetylene, the nickel carbonyl and the acid, for example alcoholic hydrochloric acid or dry hydrogen chloride, are fed in, together with acetylene, at a temperature of the mixture of between 30° and 120° C. The acetylene should be used in such an amount that it is always present in excess over the carbon monoxide present in the nickel tetracarbonyl and the free carbon monoxide. After all of the nickel tetracarbonyl and acid have been added, acetylene is further introduced as long as it is taken up by the reaction mixture. Some carbon monoxide will always be detected in the off-gas. The reaction mixture is then processed in the manner conventional in the separation of acid mixtures. Any solvent or diluent used and/or any excess of alcohol are distilled off, advantageously in the presence of polymerization inhibitors. To separate the nickel salt, the residue is extracted with ether and the ethereal solution filtered. It is also possible first to distil off readily volatile constituents, for example acrylic ester, at reduced pressure, and then to dissolve the residue in ether and separate it from the nickel salt and copper. Since the esters of olefinically unsaturated dicarboxylic acids formed have very high boiling points, they can be distilled only under a very high vacuum.

If part of the nickel tetracarbonyl be replaced with carbon monoxide, the latter is passed into the reaction mixture in an appropriate amount, i.e., molar ratios of acetylene to carbon monoxide of 1:0 to 1:0.7 are used. In this case the ratio of nickel tetracarbonyl to acetylene is within the range of 0.05:5 to 0.25:1.3.

The process may also be carried out continuously, for example in a scrubbing tower which is constantly kept under a slight acetylene pressure, the alcohol, nickel tetracarbonyl and acid being introduced in appropriate amounts. The unsaturated dicarboxylic esters obtained by the process according to the present invention can be used with advantage for the production of polyesters. They may, however, also be hydrogenated before or after saponification, so that the corresponding saturated dicarboxylic esters or free acids are formed.

The invention will be further illustrated by, but is not limited to, the following examples.

Example 1

600 g. of anhydrous ethanol, 20 g. of N,N-dimethylaniline hydrochloride and 8.5 g. of anhydrous cupric chlorides are placed in a two-liter agitated vessel fitted with a reflux cooler maintained at 0° to −20° C. by brine cooling and with gas inlet pipe which extends to near the bottom of the agitated vessel. The air in the reactor is replaced with nitrogen and then 6.4 g. of nickel tetracarbonyl diluted with 4 g. of anhydrous ethanol are allowed to drop in at a temperature of about 20° C. in the course of 15 minutes, 2.8 l. of carbon monoxide being released. In the course of 6 hours 99 g. of nickel tetracarbonyl diluted with 60 g. of anhydrous ethanol, and 135 g. of a 14% ethanolic solution of hydrogen chloride are added to the mixture separately through a gas inlet pipe, the mixture being maintained at a temperature of 65° to 66° C. At the same time 17.3 l. per hour of a gas mixture of acetylene and carbon monoxide in a volume ratio of 5.3:1.0, hereinafter referred to as mixed gas, are fed in through the gas inlet pipe. The addition of mixed gas is continued even after the addition of nickel tetracarbonyl and of the ethanolic solution of hydrogen chloride has come to a end. In the course of seven and three-quarter hours a total of 98.9 l. of acetylene and 16.5 l. of carbon monoxide are absorbed. 18.9 l. of off-gas which are withdrawn during reaction and contain 4.9 l. of carbon monoxide in addition to acetylene, entrain 40.9 g. of nickel tetracarbonyl which is condensed in a trap cooled with solid carbon dioxide and methanol. 58.1 g. of the nickel tetracarbonyl added are decomposed yielding 32.6 l. of carbon monoxide, i.e., 4.2 l. of CO per hour, within seven and three-quarter hours. As a result, the average ratio of the acetylene feed to the total amount of carbon monoxide is 14.57:6.96 liters, i.e., 2.09:1.0.

The reaction mixture is stripped by distillation at a temperature of about 70° C. and at reduced pressure (beginning at 120 mm. Hg and dropping to 20 mm. Hg at the end of the distillation) from its highly volatile constituents, 33 g. of ethyl acrylate and 3 g. of butadiene-(1,3)-carboxylic acid-(4) ethyl ester being obtained in addition to excess ethanol. The residue left is well stirred with 4 to 5 times its volume of ether and the ethereal solution formed is filtered off by suction from the deposited nickel and copper salts. The salts are again washed with ether, dried in the air and then heated in dilute hydrochloric acid. They pass into solution leaving 4 g. of a high-molecular saponifiable product as a residue. The ethreal solution is combined with the ethereal washing liquid, the combined liquids are shaken with dilute hydrochloric acid, the ether is removed by evaporation and the oily residue subjected to fractional distillation. The yields of the various fractions are as follows:

fraction 1: 31 g. (boiling range 30° to 100° C. at a pressure of 0.1 mm. Hg).
fraction 2: 104 g. (boiling range 100° to 115° C. at a pressure of 0.1 mm. Hg; main boiling range 105° to 110° C.).
fraction 3: 12 g. (boiling range 115° to 145° C. at a pressure of 0.1 mm. Hg; main boiling range 120° to 130° C.).
fraction 4: 19 g. (boiling range 145° to 190° C. at a pressure of 0.1 mm. Hg; main boiling range 180° to 190° C.).
residue: 9 g. of polymeric esters.

Fraction 1 consists essentially of a mixture of unsaturated monocarboxylic acid esters in the following approximate proportions:

G.
Butadiene-(1,3)-carboxylic acid-(4) ethyl ester ____ 8
Hexatriene-(1,3,5)-carboxylic acid-(6) ethyl ester __ 15
Octatetraene(1,3,5,7)-carboxylic acid-(8) ethyl ester__ 1
Decaptentaene-(1,3,5,7,9)-carboxylic acid-(10) ethyl ester _____ Traces Fraction 1 also contains about 1 g. of butenedicarboxylic acid-(1,4) diethyl ester and 5 g. of hexadienecarboxylic acid-(1,6) diethyl ester.

Fraction 2 consists mainly of the diethyl ester of hexadienedicarboxylic acid-1,6) and in addition contains small amounts of the diethyl ester of octatrienedicarboxylic acid-(1,8) and of octadienedicarboxylic acid-(1,8).

Fraction 3 contains the same substances as fraction 2, but in this fraction the diethyl esters of octatrienedicarboxylic acid-(1,8) and octadienedicarboxylic acid-(1,8) are the main constituents, while the diethyl ester of hexadienedicarboxylic acid-(1,6) is present in a small amount.

Fraction 4 contains diethyl esters of higher unsaturated dicarboxylic acids having more than 10 carbon atoms, of which the proportion of those from unsaturated dicarboxylic acids having 12 carbon atoms is between about 30 and 35%.

The unsaturated dicarboxylic acid diethyl esters may be identified by way of their hydrogenation products and the saturated dicarboxylic acids obtained therefrom by saponification, i.e., adipic acid, suberic acid and sebacic acid. The diethyl esters of unsaturated dicarboxylic acids having 12 and more carbon atoms are very difficult to prepare in a pure state and therefore their structural formula cannot be established reliably.

Further examples (2 to to 12) are given in Tables 1, 2 and 3 below. These examples differ from Example 1 as follows:

Example 2

Cuprous chloride is used instead of cupric chloride.

Example 3

The ratio of the mixed gas is 9.0:1.0 instead of 5.3:1.0.

Example 4

N,N-dimethylanisidine hydrochloride is used as a complex former instead of N,N-dimethylaniline hydrochloride.

Example 5

N,N-dimethyl-p-toluidine hydrochloride is used as a complex former instead of N,N-dimethylaniline hydrochloride.

Example 6

N-methylaniline hydrochloride is used as a complex former instead of N,N-dimethylaniline hydrochloride.

Example 7

The ratio of the mixed gas is 6.1:1.0 instead of 5.3:1.0.

Example 8

The mixed gas is fed into the reaction mixture through the hollow stirrer shaft and stirrer blades.

Example 9

Pure acetylene is used instead of mixed gas and N,N-dimethylamino acidic acid is used instead of N,N-dimethylaniline hydrochloride as a complex former.

Example 10

Pure acetylene is used instead of mixed gas as in Example 9 and salicylaldehyde is used instead of N,N-dimethylaniline hydrochloride as a complex former.

Example 11

The process is carried out in the absence of a heavy metal salt.

Example 12

Mercuric chloride is used instead of cupric chloride.

TABLE 1

| Ex. No. | Ethanol, g. | Complex former | Metal salt, g. |
|---|---|---|---|
| 2 | 775 | 20 g. N,N-dimethylaniline hydrochloride | 12.5 CuCl |
| 3 | 775 | do | 8.5 CuCl$_2$ |
| 4 | 775 | 23.6 g. o-dimethylanisidine hydrochloride | 8.5 CuCl$_2$ |
| 5 | 775 | 21.7 g. N,N-dimethyl-p-toluidine hydrochloride | 8.5 CuCl$_2$ |
| 6 | 775 | 18.2 g. N-methylaniline hydrochloride | 8.5 CuCl$_2$ |
| 7 | 775 | 20 g. N,N-dimethylaniline hydrochloride | 8.5 CuCl$_2$ |
| 8 | 775 | do | 8.5 CuCl$_2$ |

TABLE 2

| 9 | 775 | 8.5 g. N,N-dimethylamino acetic acid | 8.5 CuCl$_2$ |
|---|---|---|---|
| 10 | 775 | 8.5 g. salicylaldehyde | 8.5 CuCl$_2$ |

TABLE 3

| 11 | 775 | 20 g. N,N-dimethylaniline hydrochloride | |
|---|---|---|---|
| 12 | 775 | do | 17.2 HgCl$_2$ |

TABLE 1

| Ex. No. | Nickel tetracarbonyl, g. | | | Supply of mixed gas | | |
|---|---|---|---|---|---|---|
| | Added | Recovered | Used | Consumption of HCl, g. | Volume ratio C$_2$H$_2$:CO | Rate of supply, 1 hr. |
| 2 | 99 | 33 | 66 | 20 | 5.3:1.0 | 22.0 |
| 3 | 99 | 35.6 | 63.4 | 20 | 9.0:1.0 | 20.3 |
| 4 | 99 | 50.2 | 48.8 | 20 | 5.2:1.0 | 17.0 |
| 5 | 99 | 38.3 | 60.7 | 20 | 5.3:1.0 | 18.6 |
| 6 | 99 | 41.0 | 58 | 20 | 5.8:1.0 | 14.3 |
| 7 | 99 | 43.6 | 55.4 | 20 | 6.1:1.0 | 16.4 |
| 8 | 99 | 43.6 | 55.4 | 20 | 5.1:1.0 | 18.3 |

TABLE 2

| 9 | 99 | 26.4 | 72.6 | 20 | C$_2$H$_2$ pure | 15.1 |
|---|---|---|---|---|---|---|
| 10 | 99 | 29.0 | 70.0 | 20 | C$_2$H$_2$ pure | 16.8 |

TABLE 3

| 11 | 99 | 46.2 | 52.8 | 20 | 5.3:1.0 | 18.4 |
|---|---|---|---|---|---|---|
| 12 | 99 | 27.7 | 71.3 | 20 | 5.3:1.0 | 21.0 |

TABLE 1

| Ex. No. | Volume ratio, C$_2$H$_2$:total amount of CO | Total consumption of— | | | |
|---|---|---|---|---|---|
| | | C$_2$H$_2$, l. | CO added in gas form, l. | CO from used-up Ni(CO)$_4$, l. | CO total, l. |
| 2 | 1.91:1.0 | 99 | 16 | 37.1 | 53.1 |
| 3 | 2.30:1.0 | 88.8 | 6.4 | 35.5 | 41.9 |
| 4 | 2.32:1.0 | 93.4 | 15.2 | 27.5 | 42.7 |
| 5 | 2.00:1.0 | 95 | 16.3 | 34.1 | 50.4 |
| 6 | 1.90:1.0 | 80.1 | 11.8 | 32.6 | 44.4 |
| 7 | 2.19:1.0 | 90.8 | 13.2 | 31.1 | 44.3 |
| 8 | 2.10:1.0 | 85.5 | 13.3 | 31.1 | 44.4 |

TABLE 2

| 9 | 2.11:1.0 | 86.3 | | 37.2 | 37.2 |
|---|---|---|---|---|---|
| 10 | 3.20:1.0 | 102.3 | | 35.4 | 35.4 |

TABLE 3

| 11 | 2.21:1.0 | 97.2 | 16.6 | 29.7 | 46.3 |
|---|---|---|---|---|---|
| 12 | 2.08:1.0 | 93.3 | 15.7 | 40.1 | 55.8 |

TABLE 1

| Ex. No. | Composition of total off-gas, l. | | Reaction temperature, °C. | Reaction period, hours | Ethylacrylate, g. |
|---|---|---|---|---|---|
| | C$_2$H$_2$ | CO | | | |
| 2 | 11.9 | 5.1 | 63-66 | 6 | 64 |
| 3 | 20.5 | 5.8 | 63-66 | 6 | 29 |
| 4 | 20.8 | 6.6 | 63-66 | 8 | 30.9 |
| 5 | 14.2 | 4.5 | 63-66 | 7 | 72.2 |
| 6 | 11.3 | 3.8 | 63-66 | 7.5 | 61.4 |
| 7 | 14.8 | 4.0 | 62-65 | 7.5 | 35.4 |
| 8 | 22.9 | 7.3 | 65-66 | 7 | 35.6 |

TABLE 2

| 9 | 26.7 | 3.6 | 65-67 | 7.5 | 33.3 |
|---|---|---|---|---|---|
| 10 | 23.6 | 4.0 | 63-66 | 7.5 | 23.5 |

TABLE 3

| 11 | 15.3 | 4.5 | 64-66 | 7.25 | 82.4 |
|---|---|---|---|---|---|
| 12 | 12.5 | 4.5 | 63-66 | 6 | 115 |

TABLE 1

| Ex. No. | Higher unsaturated monocarboxylic ethyl esters, g. | Dicarboxylic diethyl esters, g. | Diethyl esters of unsaturated decarboxylic acids having more than 12 carbon atoms, g. |
|---|---|---|---|
| 2 | 26 | 108 | 15 |
| 3 | 34.6 | 91.4 | 17 |
| 4 | 23.8 | 116.2 | 12 |
| 5 | 32.7 | 83.5 | 12 |
| 6 | 20.8 | 87 | 23.1 |
| 7 | 35 | 98.5 | 13 |
| 8 | 22.9 | 94.1 | 19 |

TABLE 2

| 9 | 29.7 | 65 | 15.1 |
|---|---|---|---|
| 10 | 29.5 | 69 | 19 |

TABLE 3

| 11 | 15.7 | 65.3 | 6 |
|---|---|---|---|
| 12 | 18.3 | 49 | 7 |

TABLE 1

| Ex. No. | Polymerized esters, g. | | Percentage ratio of dicarboxylic acid deithyl esters:acrylic acid ester |
|---|---|---|---|
| | Soluble in ether | Insoluble in ether | |
| 2 | 6 | 7 | 1.7:1 |
| 3 | 12 | 5.7 | 3.1:1 |
| 4 | 15 | 5.0 | 3.7:1 |
| 5 | 12 | 3.5 | 1.16:1 |
| 6 | 11 | 11.5 | 1.4:1 |
| 7 | 19 | 4.4 | 2.8:1 |
| 8 | 7 | 3 | 2.7:1 |

TABLE 2

| 9 | 10 | 11.5 | 1.95:1 |
|---|---|---|---|
| 10 | 32.3 | 19 | 3.0:1 |

TABLE 3

| 11 | 14 | 10 | 1:1.25 |
|---|---|---|---|
| 12 | 14 | 10 | 1:2.3 |

We claim:

1. A process for the production of aliphatic dicarboxylic esters having the formula ROOC—CH$_2$—(CH=CH)$_n$—CH$_2$—COOR in which R denotes an alkyl group with from 1 to 18 carbon atoms and $n$ denotes an integer of from 2 to 4, which comprises contacting a compound of the formula R—OH in which R has the meaning given above, said compound being substantially anhydrous, with acetylene and nickel tetracarbonyl and with a hydrogen halide having a molecular weight of from 35.5 to 128, at a temperature of 30° to 120° C., said process being carried out in the presence of a copper salt and of at least one complex forming compound selected from the group consisting of N,N-dialkylaniline having from 1 to 6 carbon atoms in each alkyl group; N,N-dialkylaminoacetic acid having from 1 to 4 carbon atoms in each alkyl group, and salicylaldehyde, the ratio by weight of acetylene to the carbon monoxide content of nickel tetracarbonyl being from 1.3:1 to 5:1, the nickel tetracarbonyl being used in a stoichiometric excess over the said acid.

2. A process for the production of dicarboxylic esters as claimed in claim 1 in which the complex forming substance is present in an amount of 5 to 30% by weight with reference to nickel tetracarbonyl.

3. A process for the production of dicarboxylic esters as claimed in claim 1 in which the copper salt is present in an amount of 2 to 30% by weight with reference to nickel tetracarbonyl.

4. A process as claimed in claim 1 wherein said hydrogen halide is HCl.

5. A process for the production of dicarboxylic esters as claimed in claim 4 in which the complex forming substance is present in an amount of 5 to 30% by weight with reference to nickel tetracarbonyl.

6. A process for the production of dicarboxylic esters as claimed in claim 4 in which the copper salt is present in an amount of 2 to 30% by weight with reference to nickel tetracarbonyl.

7. A process for the production of aliphatic dicarboxylic esters having the formula $$ROOC-CH_2-(CH=CH)_n-CH_2-COOR$$

in which R denotes an alkyl group with from 1 to 18 carbon atoms and $n$ denotes an integer of from 2 to 4, which comprises contacting a compound of the formula R—OH in which R has the meaning given above, said compound being substantially anhydrous, with acetylene, carbon monoxide and nickel tetracarbonyl, and with a hydrogen halide having a molecular weight of from 35.5 to 128, at a temperature of 30° to 120° C., said process being carried out in the presence of a copper salt and of at least one complex forming compound selected from the group consisting of N,N-dialkylaniline having from 1 to 6 carbon atoms in each alkyl group; N,N-dialkylaminoacetic acid having from 1 to 4 carbon atoms in each alkyl group, and salicylaldehyde, the ratio by weight of acetylene and carbon monoxide being from 1:0 to 1:0.7 and the molar ratio between nickel tetracarbonyl and acetylene being about 0.05:5 to 0.25:1.3, the nickel tetracarbonyl being used in a stoichiometric excess over the acid.

8. A process as claimed in claim 7 wherein said hydrogen halide is HCl.

References Cited

Crowe, Chemistry and Industry, 1960, p. 1000.

LORRAINE A. WEINBERGER, *Primary Examiner.*

T. L. GALLOWAY, *Assistant Examiner.*

UNITED STATES PATENT OFFICE
CERTIFICATE OF CORRECTION

Patent No. 3,396,191                            August 8, 1968

Walter Reppe et al.

It is certified that error appears in the above identified patent and that said Letters Patent are hereby corrected as shown below:

Column 2, line 38, "$C_1H_2$" should read -- $C_2H_2$ --.

Signed and sealed this 21st day of April 1970.

(SEAL)
Attest:

Edward M. Fletcher, Jr.                       WILLIAM E. SCHUYLER, JR.
Attesting Officer                                     Commissioner of Patents